US007997319B2

(12) United States Patent
Austermeier

(10) Patent No.: US 7,997,319 B2
(45) Date of Patent: Aug. 16, 2011

(54) LABELING DEVICE

(75) Inventor: Georg Austermeier, Hövelhof (DE)

(73) Assignee: Multivac Marking & Inspection GmbH & Co KG (DE)

( * ) Notice: Subject to any disclaimer, the term of this patent is extended or adjusted under 35 U.S.C. 154(b) by 409 days.

(21) Appl. No.: 12/348,499

(22) Filed: Jan. 5, 2009

(65) Prior Publication Data

US 2010/0089536 A1 Apr. 15, 2010

(30) Foreign Application Priority Data

Oct. 9, 2008 (DE) ........................ 10 2008 051 061

(51) Int. Cl.
*B65C 11/02* (2006.01)
*B65C 9/18* (2006.01)
*B65G 47/10* (2006.01)

(52) U.S. Cl. ..... 156/384; 156/388; 156/541; 198/369.4; 198/369.5

(58) Field of Classification Search .................. 156/229, 156/230, 247, 249, 384, 387, 388, 389, 391, 156/538–542, 556, 557, 566; 198/348, 351, 198/355, 369.4, 369.5, 431, 432, 433
See application file for complete search history.

(56) References Cited

U.S. PATENT DOCUMENTS 2,334,384 A * 11/1943 Cohen ........................ 198/369.5
3,877,386 A * 4/1975 Wakabayashi ............. 104/172.1
3,894,629 A * 7/1975 Wakabayashi ................ 198/718
3,985,605 A * 10/1976 Treiber et al. ................ 156/384
4,061,521 A * 12/1977 Lerner et al. .................. 156/265
4,105,199 A * 8/1978 Sato et al. ...................... 271/122
4,333,781 A * 6/1982 Meulenberg ................. 156/152
4,366,023 A * 12/1982 Voltmer ........................ 156/542
4,435,246 A * 3/1984 Green ........................... 156/542
4,465,543 A * 8/1984 Sadamasa et al. ............ 156/542
4,680,080 A * 7/1987 Instance ........................ 156/357
4,711,687 A * 12/1987 Paules ........................... 156/235

(Continued)

FOREIGN PATENT DOCUMENTS

DE 10 2006 047 488 A1 4/2008

(Continued)

OTHER PUBLICATIONS

European Search Report Dated Jan. 21, 2010., Applicant MR Etikettiertechnik GmbH & Co, KG, Application No. 09012773.9-1261, 4 Pages.

(Continued)

*Primary Examiner* — Philip C Tucker
*Assistant Examiner* — Sing P Chan
(74) *Attorney, Agent, or Firm* — Brooks Kushman P.C.

(57) ABSTRACT

A labeling device includes a conveyor belt for taking up a row of labels, and two label dispensers, each for dispensing labels from a dispensing sheet over a dispensing edge onto the conveyor belt. The label dispensers are disposed one behind the other, the dispensing edge of a rear one of the dispensers being shifted, so that the dispensing edges of the two label dispensers are one above the other. The conveyor belt is guided over a belt deflector for changing the course of the belt between two positions as to the dispensing edges, the belt deflector including a tilting lever, over which the conveyor belt is deflected and which can be swiveled between two positions. The conveyor belt is in a first position for taking up labels at the first dispensing edge and in a second position, for taking up labels at the second dispensing edge.

6 Claims, 4 Drawing Sheets

U.S. PATENT DOCUMENTS

Figure 1:
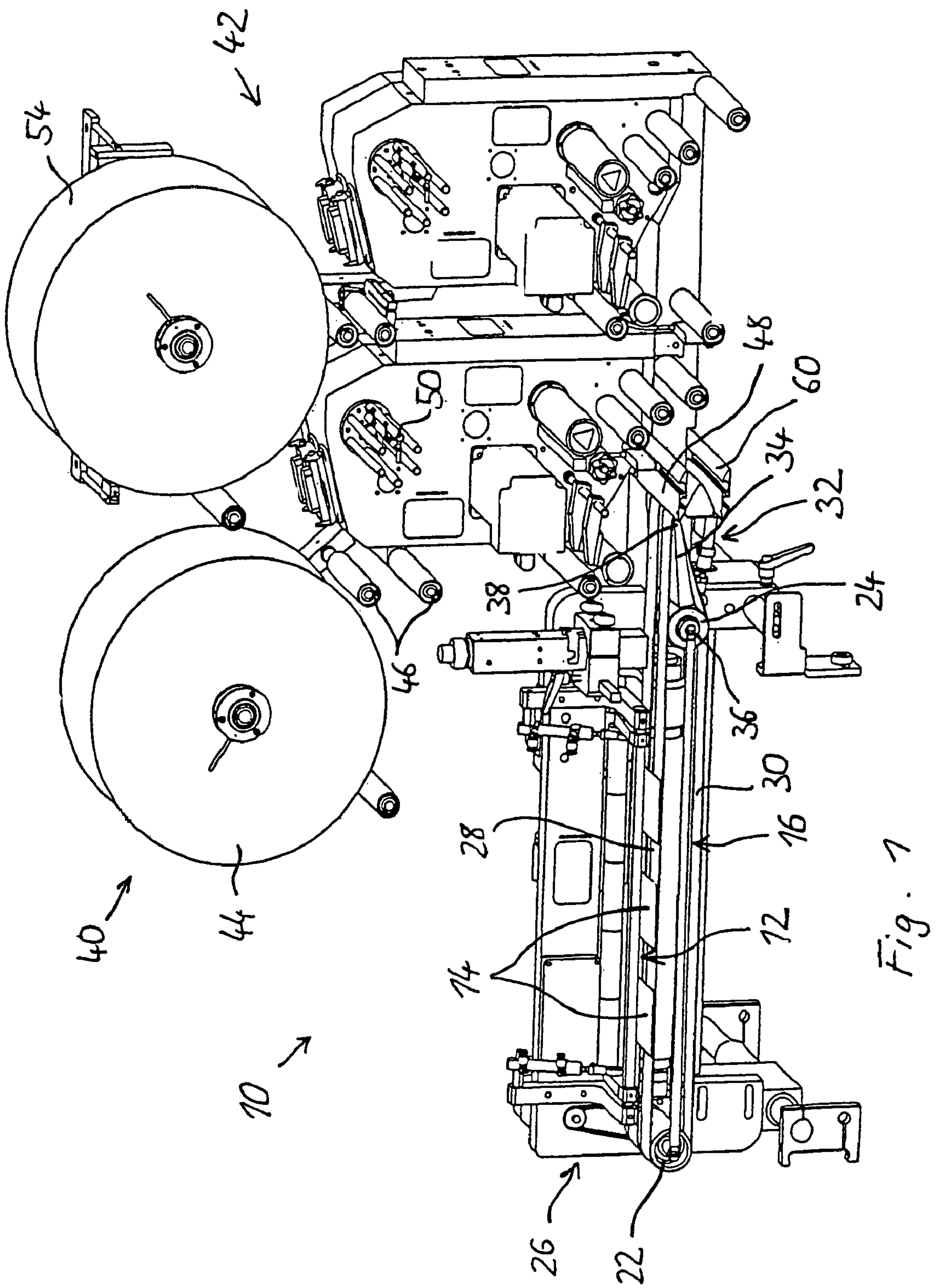

| | | | | |
|---|---|---|---|---|
| 4,856,642 | A * | 8/1989 | Nicholson et al. | 198/370.04 |
| 4,985,096 | A * | 1/1991 | Bekker-Madsen | 156/64 |
| 5,078,263 | A * | 1/1992 | Thompson et al. | 198/807 |
| 5,133,827 | A * | 7/1992 | Ratermann | 156/361 |
| 5,188,210 | A * | 2/1993 | Malow | 198/369.5 |
| 5,281,296 | A * | 1/1994 | Beliveau | 156/542 |
| 5,370,024 | A * | 12/1994 | Lerner et al. | 83/154 |
| 5,540,795 | A * | 7/1996 | Franklin et al. | 156/64 |
| 5,622,594 | A * | 4/1997 | Lerner et al. | 156/521 |
| 5,674,350 | A * | 10/1997 | Jurgich | 156/540 |
| 5,679,209 | A * | 10/1997 | Hinton et al. | 156/566 |
| 5,725,717 | A * | 3/1998 | Harte et al. | 156/299 |
| 5,876,555 | A * | 3/1999 | Hellsund et al. | 156/540 |
| 5,988,251 | A * | 11/1999 | Hunt et al. | 156/539 |
| 6,030,481 | A * | 2/2000 | Winter et al. | 156/265 |
| 6,086,691 | A * | 7/2000 | Lehockey et al. | 148/706 |
| 6,152,284 | A * | 11/2000 | Sandberg et al. | 198/432 |
| 6,186,317 | B1 * | 2/2001 | Hovsto et al. | 198/806 |
| 6,416,612 | B1 * | 7/2002 | Lerner et al. | 156/277 |
| 6,615,106 | B2 * | 9/2003 | Soto et al. | 700/235 |
| 6,634,400 | B2 * | 10/2003 | Barbosa | 156/384 |
| 7,007,601 | B2 * | 3/2006 | Winter et al. | 101/35 |
| 7,017,640 | B2 * | 3/2006 | Winter et al. | 156/562 |
| 7,718,020 | B2 * | 5/2010 | Lerner et al. | 156/64 |
| 7,832,440 | B2 * | 11/2010 | Richardson et al. | 156/350 |
| 2009/0199961 | A1 * | 8/2009 | Georg | 156/230 |

FOREIGN PATENT DOCUMENTS

| | | | |
|---|---|---|---|
| DE | 102 28 243 | A1 | 2/2010 |
| WO | 0181181 | A1 | 11/2001 |

OTHER PUBLICATIONS

European Patent Office Machine Translation of Abstract for Corresponding German Reference DE 10228243 A1, (Feb. 3, 2010).

* cited by examiner

LABELING DEVICE

The present invention relates to a labeling device with at least one conveyor belt for taking up a row of labels, which is passed over an arrangement of rolls, and to at least two label dispensers, each of which is provided for dispensing labels from a dispensing sheet over a dispensing edge onto the conveyor belt.

Such labeling devices may be a component of a transverse lane labeler, which is provided for labeling articles, such as packages or the like, which are guided in parallel lanes. The labels are dispensed in rows from a dispensing sheet onto the conveyor belt and applied on to the articles by means of a suitable transferring device. This may, for example, comprise a suction box, under which the conveyor belt is passed and from which a plunger, for pressing the labels down, can be extended. Such a system is shown, for example in DE 10 2006 047 488 A1. Furthermore, transfer devices are known for the batchwise application of labels on articles. For these devices, rows of labels are first of all transferred consecutively from the conveyor belt to a transfer belt, which extends transversely to the conveyor belt, and, subsequently, the set, consisting of several rows of labels, is dispensed from the transfer belt to the articles.

It is desirable to operate the labeling device as far as possible without interruptions and not to interrupt the running of this device even when the supply of labels for the dispenser is exhausted. For this reason, the use of at least two label dispensers, which alternately can service the conveyor belt, was proposed, so that the conveyor belt can be supplied by the second label dispenser when the supply of the first dispenser is exhausted.

Such an arrangement is proposed in DE 10 2006 047 488 A1, which has already been mentioned. The label dispenser is static here, whereas the placement casing with the conveyor belt can be moved transversely to the running direction of the latter between two positions, at which the conveyor belt can take up the labels from the dispensers. An obvious disadvantage of this arrangement consists therein that, during the operation of the device, large masses must be moved during the shifting of the placement casing. For an approximately interruption-free operation, the dispenser, which is standing by with a new supply of labels, must be started up in the shortest possible time immediately after the dispenser roll of the currently used label dispenser is emptied. Such a procedure is associated with high accelerations. A further disadvantage of this arrangement consists therein that a peripheral device, such as a printer for printing the labels, which are to be transferred to the conveyor belt, must be available at each label dispenser. Overall, the construction costs of the installation are comparatively high.

It is therefore an object of the present invention to develop such a labeling device further, so that the aforementioned problems do not occur anymore.

According to the invention, this objective is accomplished by a labeling device with the distinguishing features of claim 1.

The conveyor belt of the inventive labeling device is passed over a belt deflector for changing the course of the belt, so that the conveyor belt can be operated alternatively by the dispensing edges of the two label dispensers. For this purpose, these dispensing edges are stationary and disposed adjacent to the belt deflector in such a manner that, in a first swiveling position of the tilting lever, labels can be transferred from the first dispensing edge to the conveyor belt and, in a second position, labels can be taken up from the second dispensing edge.

The conveyor belt, as well as the two label dispensers is stationary here and, for the change-over between the two label dispensers, neither the conveyor belt nor the label dispenser have to be moved. The change-over between the two take-up positions of the conveyor belt, which are closely adjacent to one another, can be carried out by a simple swiveling of the tilting lever of the belt deflector. The masses, which have to be moved during this process, are very small, enabling the switch-over processes to be very rapid.

Because of the stationary arrangement of the conveyor belt, only a single label printer, for example, is required for printing the labels taken up and not, as in the prior art, a printer for each label dispenser. This advantage may also exist for further peripheral equipment required.

In a preferred embodiment of the invention, the swivel axis of the tilting lever is parallel to the axes of the rolls for guiding the conveyor belt.

Preferably, the two label dispensers are disposed one behind the other with respect to the direction, in which the conveyor belt extends, the dispensing edge of the rear one of the two label dispensers being shifted to the front in the direction of the conveyor belt in such a manner, that the dispensing edges of the two label dispensers are one above the other.

According to a further preferred embodiment, the pivot axis of the tilting lever coincides with the axis of a roll for guiding the conveyor belt.

Preferably, the conveyor belt is constructed as an endless belt, the upper strand of which is provided for taking up the labels.

Furthermore, preferably the printer for printing labels is provided above the section of the conveyor belt provided for taking up the labels.

In a further preferred embodiment, a driving mechanism is disposed above a driving roll of the conveyor belt in a region next to the section of the conveyor belt, which is provided for accommodating the labels.

Figure 2:
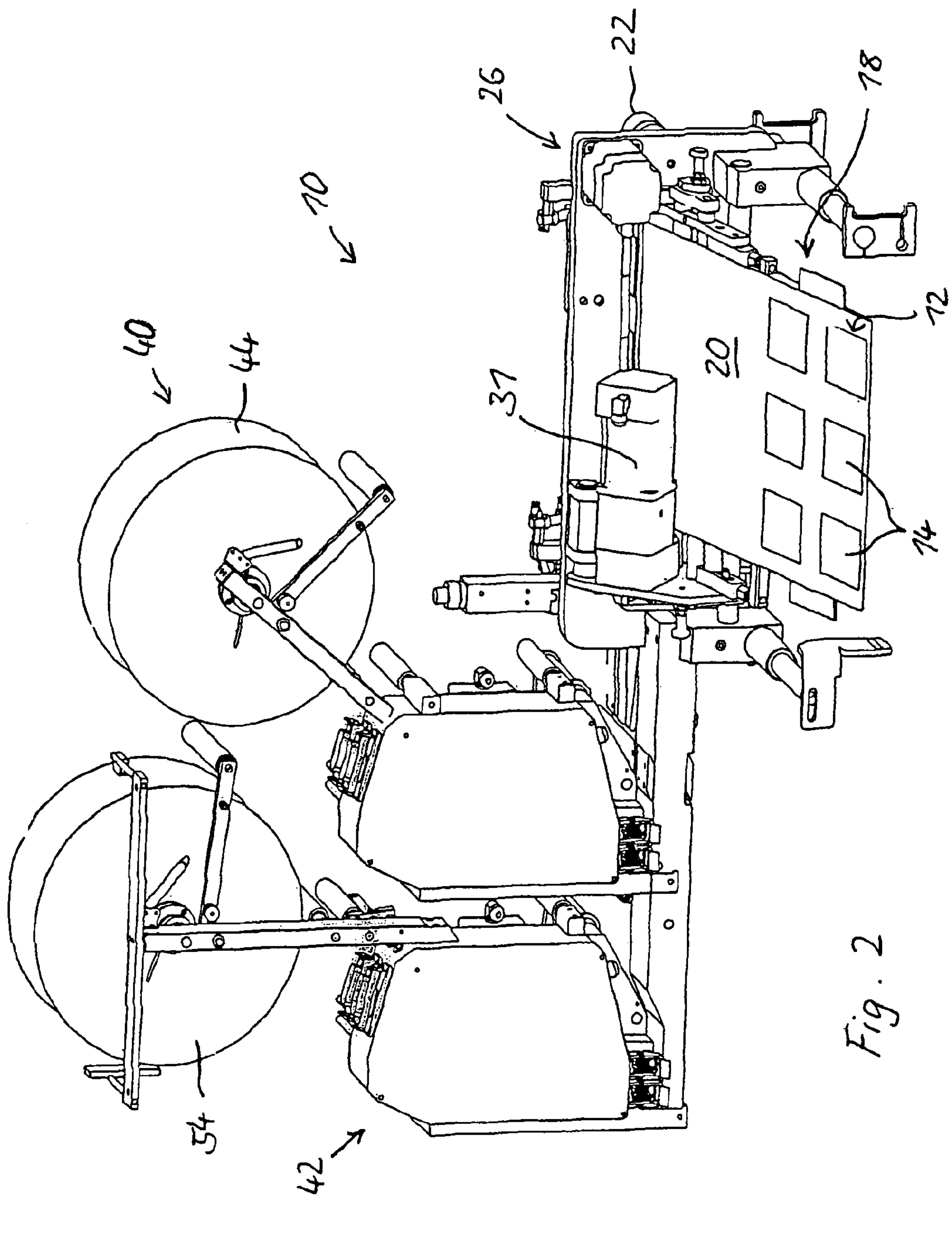
Figure 3:
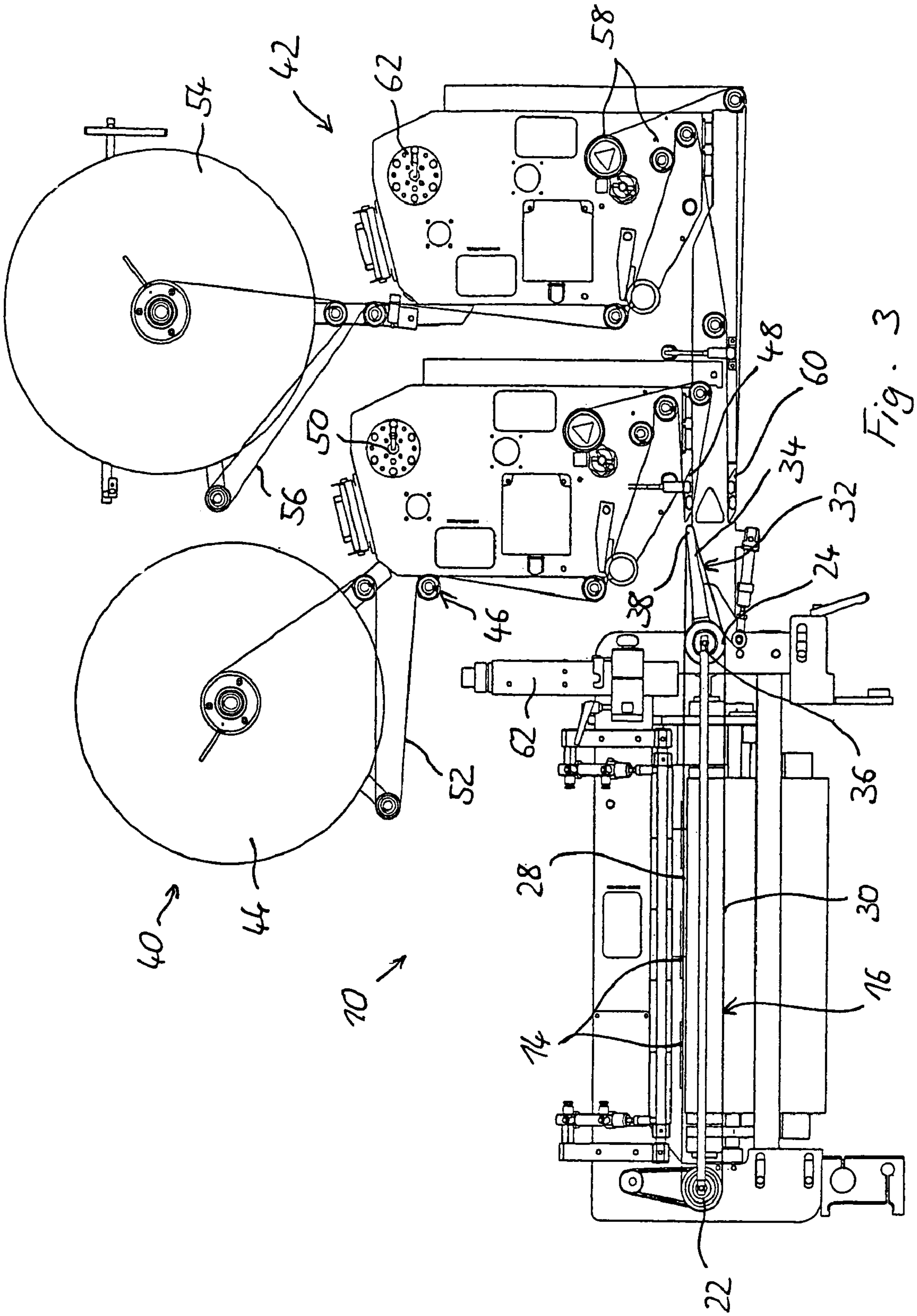
Figure 4:
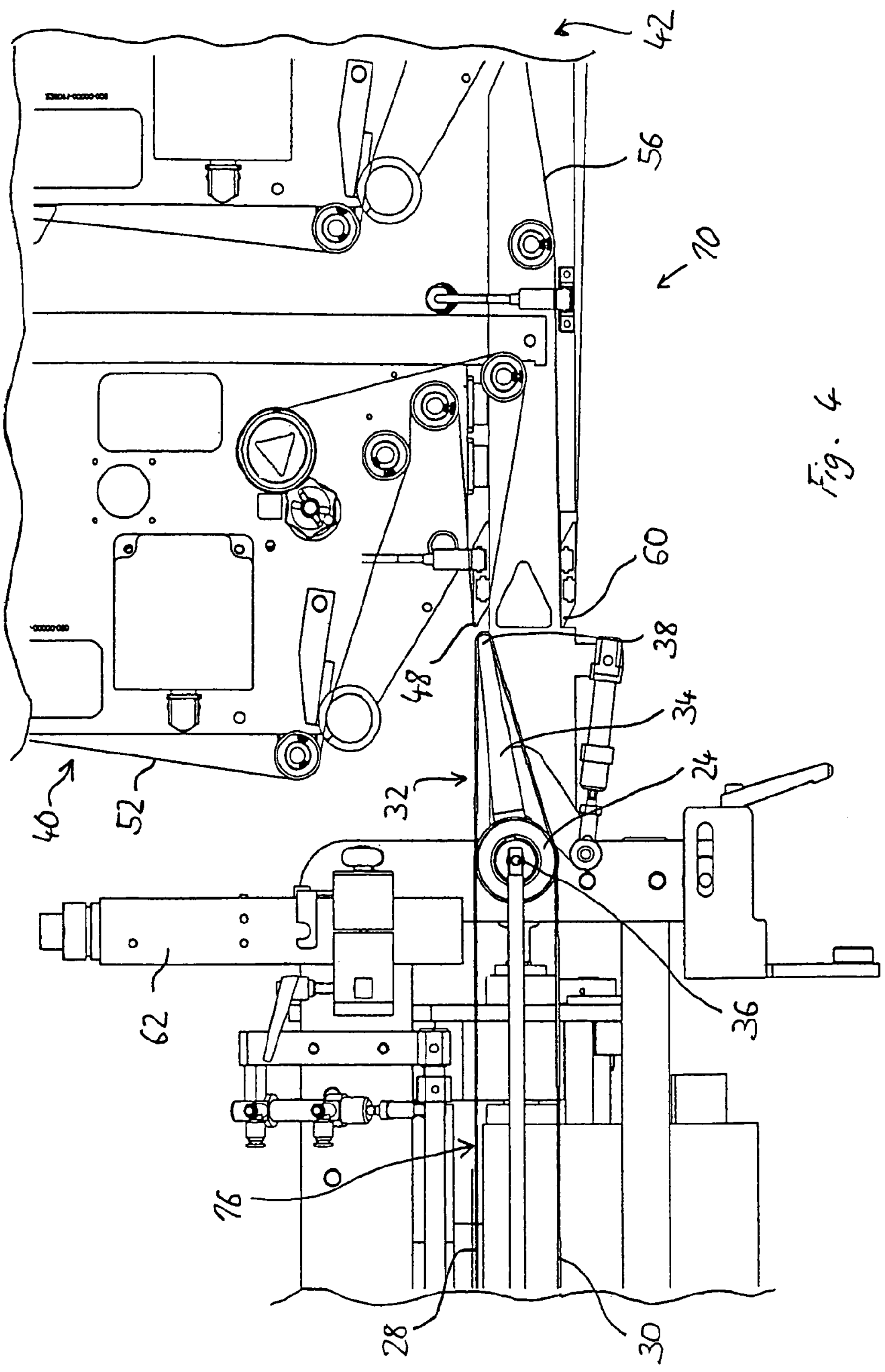

In the following, a preferred example of the invention is described in greater detail by means of the drawing, in which FIG. 1 is a perspective representation of an embodiment of the inventive labeling device, FIG. 2 shows a labeling device of FIG. 1 in a perspective representation from a different viewing angle, FIG. 3 shows the embodiment of the labeling device of FIGS. 1 and 2 in a side view and FIG. 4 is a view showing the details of the labeling device of FIG. 3.

The labeling device 10, shown in FIG. 1, is a component of a transverse lane labeler labeling articles such as packages or the like, which are guided in lanes. For this purpose, a row 12 of labels 14 is taken up in each case on a conveyor belt 16 and subsequently transferred by means of a suitable transfer device onto the article, the details of which are not shown. As is shown in greater detail in FIG. 2, the transfer device 18 is a transfer belt 20, which is constructed as an endless belt, the upper strand of which extends transversely to the running direction of the conveyor belt 16. Rows 12 of labels 14 are deposited consecutively on the upper strand of the transfer belt 20 and subsequently the transfer belt 20 transfers a set of a number of rows 12 of labels 14 onto the articles. FIG. 2 furthermore shows a driving mechanism 31 for the transfer belt 20, which is disposed above the upper strand of the transfer belt 20.

As can be seen in FIG. 1, the conveyor belt 16 is constructed in two parts, that is, it comprises actually two endless belts, which are guided parallel to one another. Alternatively, the conveyor belt 16 may also be constructed in one piece. It is guided over an arrangement of rolls 22, 24, which are held in a machine frame 26 at about the same height above the article lanes. The upper strand 28 and the lower strand 30 of the conveyor belt 16 accordingly run horizontally and parallel to one another. The left roll 22 in FIG. 1 is driven to rotate over a drive belt and a driving device, the details of which are not shown.

The left roll 22 in FIG. 1 is a guide roller, over which the section of the belt of the upper strand 28, approaching from the right, is deflected into the parallel lower strand 30. From the viewing direction in FIG. 1, the conveyor belt 16 accordingly runs in the counterclockwise direction. The right roll 24 carries the upper strand 28 on its upper side, whereas the lower strand 30 is in contact with its underside. The axes of the two rolls 22, 24 are horizontal and parallel to one another, so that the upper surface of the conveyor belt 16 is also horizontal.

At the right side of the conveyor belt 16, opposite to the guide roller 22, this belt 16 is deflected over a belt deflector 32 and not directly over the right roll 24. The belt deflector comprises a tilting lever 34, which can be swiveled upward and downward about the axis of rotation of the right roll 24 within a certain range of angles. The tilting lever 34 extends essentially from the axis 36 of the roll 24 to the right and its end is constructed as a relatively narrow edge, over which the conveyor belt 16 runs and is deflected. FIG. 1 shows the tilting lever 34 in an upper angular position, in which the end 38 of the tilting lever 34 is disposed higher than in a lower angular position, the details of which are not shown here.

The upper strand 28 of the conveyor belt 16 is loaded with labels 14 by two label dispensers 40, 42, the arrangement and construction of which is to be described in greater detail in the following.

With respect to the direction, in which the conveyor belt 16 extends, the two label dispensers 40 and 42 are disposed one behind the other and essentially at the same height. The label dispenser 40, which is at the left in FIG. 1, is therefore referred to in the following as the front label dispenser 40, which is disposed closer to the conveyor belt 16, whereas the label dispenser 42, which is on the right in FIG. 1, is referred to as the rear label dispenser with respect to the arrangement of the conveyor belt 16. The front label dispenser 40 comprises a supply roll 44 of a dispensing sheet, the details of which are not shown here and which is passed over an arrangement of rolls 46 over an upper dispensing edge 48 to a reel 50, on which the dispensing sheet is wound up once again. At the dispensing edge 48, the labels 14, which are lined up on the dispensing sheet, are dispensed from this onto the upper strand 28 of the conveyor belt 16 and the empty dispensing sheet can subsequently be wound up on the reel 50. The course of the dispensing sheet 52 of the front label dispenser 40 is shown particularly in FIG. 3. The dispensing of labels 14 from the dispensing sheet 52 of the front labeler 40 can take place only in the upper position of the belt deflector 32, in which the tilting lever 34 is tilted upward. The deflection point of the conveyor belt 16 at the right outer end of the tilting lever 34 is then in the immediate vicinity of the dispensing edge 48, so that the labels 14 can be transferred without problems from the dispensing sheet 52 to the conveyor belt 16.

The rear label dispenser 42 also comprises a supply roll 54 for a dispensing sheet 56 (FIG. 3), which is guided over an arrangement of rolls 58 to a further dispensing edge 60 and beyond this to a reel 62, on which the empty dispensing sheet 56 is wound up. Like the first dispensing edge 48 of the front label dispenser 40, the second dispensing edge 60 of the rear label dispenser 42 also dispenses labels 14 onto the upper strand 28 of the conveyor belt 16. The arrangements of the guide roller 46, 58 and of the supply rolls 44, 54 of the front and the rear label dispensers 40, 42 are approximately the same and correspond to conventional label dispensers. On the other hand, the dispensing edge 60 of the rear label dispenser 42 is displaced towards the front in the direction of the conveyor belt 16 in such a manner, that the two dispensing edges 48 and 60 are one above the other at a distance from one another. The upper dispensing edge 48 here is that of the front label dispenser 40, whereas the lower dispensing edge 60 is assigned to the rear label dispenser 42.

Both label dispensers 40 and 42 accordingly are in a position to guide a dispensing sheet 52, 56, provided with labels 14, over a dispensing edge 48, 60, which is assigned to the respective label dispenser 40, 42, and dispense labels 14 onto the conveyor belt 16 and, moreover, as a function of the position of the belt deflector 32, as explained in the following. For this purpose, reference is to be made to the side view in FIG. 3 and, furthermore, to the enlarged detailed view in FIG. 4.

The belt deflector 32 is in its upper position here, that is, the tilting lever 34 is swiveled into an upper accommodating position, in which the right end of the upper strand 28 of the conveyor belt 16 is close to the upper dispensing edge 48 of the front label dispenser 40. In this position, labels 14 can be dispensed in a known manner consecutively from the dispensing sheet 52 of the front label dispenser 40 onto the upper strand 28 of the conveyor belt 16.

Alternatively, however, it is possible to dispense labels 14 from the second dispensing sheet 56 of the rear label dispenser 42 onto the conveyor belt 16. For this purpose, the tilting lever 34 of the belt deflector 32 can be tilted into a lower position, in which the right end of the upper strand 28 of the conveyor belt 16 is in the immediate vicinity of the lower dispensing edge 60 of the rear label dispenser 42. In this second accommodating position, labels 14 can be dispensed from the second dispensing sheet 56 onto the conveyor belt 16.

Depending on the position of the belt deflector 32, it is thus possible to select a label dispenser 40 or 42 for loading the conveyor belt 16. In particular, by switching over the belt deflector 32 rapidly, it is possible to switch over from one label dispenser 40 the second label dispenser 42. This may be necessary when the dispensing sheet 52 of the label dispenser 40 currently in use becomes empty. In this case, the second label dispenser 42 with a filled supply roll 54 of the second dispensing sheet 56 is available immediately. Accordingly, the labeling machine can run practically without interruption even during a change from one dispensing sheet 52 to the next 56. Such a switching over of the belt deflector 32 is possible even during the completion of a row 12 of labels 14 on the upper strand 28 of the conveyor belt 16. The alternating acceptance of labels 14 from the two dispensing sheets 52, 56 is also conceivable. The dispensing sheets 52 and 56 of the two label dispensers 40, 42 can also be loaded with different labels 14, so that it becomes possible to select one of the two types of labels by means of the belt deflector 32.

The two label dispensers 40, 42 have been modified only insignificantly for the use here, so that the overall construction remains relatively simple. Moreover, further advantages arise from the use of the inventive labeling device 10. For example, a single printer 62 may be used for printing the labels 14, which have been transferred on the conveyor belt 16; this represents an advantage over other known labeling devices, which admittedly use several label dispensers, but require each dispenser to have its own set of peripheral devices. Since the conveyor belt 16 as well as the two label dispensers 40, 42 are disposed in a stationary manner, large masses do not have to be moved when changing from one label dispenser 40 to the other 42 or vice versa.

What is claimed is:

1. A labeling device comprising:

at least one conveyor belt for taking up a row of labels, an arrangement of rolls over which the at least one conveyor belt is passed, and at least two label dispensers, each of which includes a dispensing edge provided for dispensing labels from a dispensing sheet over a respective said dispensing edge to the conveyor belt, and a belt deflector over which the conveyor belt is passed, the belt deflector including a tilting lever, for changing the course of the belt, wherein the dispensing edges of the at least two label dispensers are disposed stationary at the belt deflector and the tilting lever of the belt deflector is adapted to be swiveled between two positions, in a first of which the conveyor belt is disposed in a first position for taking up labels at the first dispensing edge and in a second position for taking up labels at the second dispensing edge.

2. The labeling device of claim 1, wherein:

the two label dispensers are disposed one behind the other with respect to a direction in which the conveyor belt extends, the dispensing edge of a rear one of the two label dispensers being shifted forward in the direction of the conveyor belt in such a manner, that the dispensing edges of the two label dispensers are one above the other.

3. The labeling device of claim 1, wherein the tilting lever includes a swiveling axis which is parallel to axes of the rolls for guiding the conveyor belt.

4. The labeling device of claim 1, wherein the tilting lever includes a swiveling axis which coincides with an axis of one said roll for guiding the conveyor belt.

5. The labeling device of claim 1, wherein the conveyor belt is formed as an endless belt having an upper strand for taking up the labels.

6. The labeling device of claim 1, further comprising a printer for printing the labels, and which is disposed above a section of the conveyor belt, which is provided for taking up the labels.

* * * * *

UNITED STATES PATENT AND TRADEMARK OFFICE

CERTIFICATE OF CORRECTION

PATENT NO. : 7,997,319 B2
APPLICATION NO. : 12/348499
DATED : August 16, 2011
INVENTOR(S) : Austermeier It is certified that error appears in the above-identified patent and that said Letters Patent is hereby corrected as shown below:

Column 5, Claim 1, Line 15:

After “tilting lever” delete “,”.

Signed and Sealed this
Eighth Day of November, 2011

David J. Kappos
*Director of the United States Patent and Trademark Office*